US008521195B1

(12) United States Patent
Oroskar et al.

(10) Patent No.: US 8,521,195 B1
(45) Date of Patent: Aug. 27, 2013

(54) PAGING POWER CONTROL BASED ON PAGE CONCATENATION

(75) Inventors: Siddharth S. Oroskar, Overland Park, KS (US); Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 361 days.

(21) Appl. No.: 12/756,027

(22) Filed: Apr. 7, 2010

(51) Int. Cl.
*H04W 68/00* (2009.01)

(52) U.S. Cl.
USPC ............ 455/458; 455/522; 370/311; 370/312

(58) Field of Classification Search
None
See application file for complete search history.

(56) References Cited

U.S. PATENT DOCUMENTS

| | | | |
|---|---|---|---|
| 5,111,197 A | 5/1992 | Ichikawa | |
| 5,369,681 A | 11/1994 | Boudreau et al. | |
| 5,673,259 A * | 9/1997 | Quick, Jr. | 370/342 |
| 5,884,170 A | 3/1999 | Valentine et al. | |
| 6,088,589 A | 7/2000 | Valentine et al. | |
| 6,138,034 A | 10/2000 | Willey | |
| 6,181,945 B1 | 1/2001 | Lee | |
| 6,188,885 B1 | 2/2001 | Kolev et al. | |
| 6,711,413 B1 | 3/2004 | Heidari | |
| 6,745,039 B1 | 6/2004 | Di Lalla | |
| 6,856,789 B2 | 2/2005 | Pattabiraman et al. | |
| 6,963,750 B1 | 11/2005 | Cheng et al. | |
| 7,366,526 B2 | 4/2008 | Zhang et al. | |
| 7,583,984 B2 | 9/2009 | Sun et al. | |
| 2005/0164741 A1 | 7/2005 | Rajkotia et al. | |
| 2006/0018347 A1* | 1/2006 | Agrawal | 370/537 |
| 2006/0251033 A1* | 11/2006 | Oprescu-Surcobe et al. | 370/338 |
| 2007/0057767 A1 | 3/2007 | Sun et al. | |
| 2007/0060175 A1 | 3/2007 | Park et al. | |
| 2008/0032713 A1 | 2/2008 | Yang | |
| 2008/0096520 A1 | 4/2008 | Benco et al. | |
| 2008/0188247 A1* | 8/2008 | Worrall | 455/458 |
| 2008/0293437 A1 | 11/2008 | Ranganathan et al. | |
| 2008/0317144 A1 | 12/2008 | Huang et al. | |
| 2010/0128621 A1 | 5/2010 | Hamabe et al. | |

OTHER PUBLICATIONS

Cai et al., "Mitigating DoS Attacks on the Paging Channel by Efficient Encoding in Page Messages," Computer Science Department.
Unpublished U.S. Appl. No. 12/690,629, filed Jan. 20, 2010 entitled "Dynamic Paging Concatenation".
Unpublished U.S. Appl. No. 12/558,359, filed Sep. 11, 2009 entitled "Dynamic Paging Concatenation".
Unpublished U.S. Appl. No. 12/553,661, filed Sep. 3, 2009 entitled "Method and System for Paging a Mobile Station".

(Continued)

*Primary Examiner* — German Viana Di Prisco (57) ABSTRACT

Exemplary methods and systems are disclosed herein that may help to dynamically adjust page-transmission power based on the amount of concatenation being applied to a page. An exemplary method involves: (i) before transmission of a page to a mobile station by an access network, the access network identifying any concatenation that is being applied to the page; (ii) based at least in part on the concatenation that is being applied to the page, the access network selecting a page-transmission power for the page; and (iii) the access network transmitting the page to the mobile station at the selected page-transmission power. In an exemplary embodiment, a base station may increase the page-transmission power as the amount of concatenation increases, which may help to improve the paging success rate (PSR) for concatenated pages, among other benefits.

17 Claims, 4 Drawing Sheets

(56) References Cited

OTHER PUBLICATIONS

Unpublished U.S. Appl. No. 12/572,829, filed Oct. 2, 2009 entitled "Overflow Pages in Heavily Loaded Slots".
Unpublished U.S. Appl. No. 12/786,184, filed May 24, 2010 entitled "Dynamic Adjustment of Paging Power Based on Page-Type".
Unpublished U.S. Appl. No. 12/115,226, filed May 5, 2008 entitled "Managing Transmission Power for Message Waiting Notification".
Unpublished U.S. Appl. No. 11/772,466, filed Jul. 2, 2007 entitled "Dynamic Variation of Paging Power Based on Paging Slot Frequency".

\* cited by examiner

PAGING POWER CONTROL BASED ON PAGE CONCATENATION

BACKGROUND

In a typical cellular wireless communication system, an area is divided geographically into a number of cells and cell sectors, each defined by a radio frequency (RF) radiation pattern from a respective base station antenna. The base station antennae in the cells may then be coupled with a base station controller, which may then be coupled with a switch or gateway that provides connectivity with a transport network such as the public switched telephone network (PSTN) or the Internet. When a mobile station, such as a cellular telephone, pager, or wirelessly-equipped computer, is positioned in a cell, the mobile station communicates via an RF air interface with the base station antennae of a cell. Consequently, a communication path can be established between the mobile station and the transport network, via the air interface, the base station, the base station controller, and the switch or gateway.

Further, in some wireless communication systems, multiple base stations are connected with a common base station controller, and multiple base stations are connected with a common switch or gateway. Each base station controller may then manage air interface resources for multiple wireless coverage areas (e.g., multiple cells and sectors), by performing functions such as assigning air interface traffic channels for use by mobile stations in the coverage areas and orchestrating handoff of calls between coverage areas. In turn, a switch and/or gateway may control one or more base station controllers and generally control wireless communications, by performing functions such as receiving and processing call requests, instructing base station controllers when to assign traffic channels, paging mobile stations, and managing handoff of calls between base station controllers.

In general, air interface communications in each sector (or other such coverage area) of a cellular wireless communication system can be encoded or carried in a manner that distinguishes the communications in that sector from communications in adjacent sectors. For example, in a Code Division Multiple Access (CDMA) system, each sector has a respective pseudo-random noise offset or "PN offset" that is used to encode or modulate air interface communications in the sector distinctly from those in adjacent sectors. Analogously, in other air interface protocols, communications in one sector may be distinguished from those in other sectors by frequency, time, and/or various other parameters.

Each sector may define an air interface "access channel" on which mobile stations can send "access probes" seeking to originate calls (e.g., voice calls, data sessions, and/or other "calls") or seeking to register their presence in the sector. Further, each sector may define an air interface "paging channel" on which the serving base station can page a mobile station. For example, paging channel may be used to send access probe acknowledgements and traffic channel assignment messages to served mobile stations. The paging channel also defines timeslots in which the base station can send various messages to particular mobile stations. For instance, if an access probe is received from one mobile station seeking to connect to a second mobile station, the base station may send a page via the paging channel to notify the second mobile station of the incoming call.

When a base station pages a mobile station, the power with which the page (or the paging message in which a number of pages are grouped) is transmitted may be referred to as the "page-transmission power." Typically, the page-transmission power is fixed, and is provided to the base station via a handshake process with the switch to which the base station is connected, when the service provider installs the base station.

If a base station has numerous page messages to send, the paging channel can become congested, which may delay call setup or even result in a page not reaching the intended mobile station. Accordingly, in a further aspect of existing CDMA access networks, base stations commonly group a certain number of pages (that are typically intended for different mobile stations) into a common page message for transmission via the paging channel. Furthermore, to conserve bandwidth, and so more pages can be transmitted per timeslot, each page included in the page message may be concatenated.

OVERVIEW

In various co-owned applications, methods and systems are disclosed for varying the amount of concatenation applied to pages based on various factors. For example, co-owned U.S. patent application Ser. No. 12/699,273, which is herein incorporated by reference in its entirety, discloses methods and systems for dynamically adjusting the page-concatenation level (i.e., the amount of concatenation) based on the paging channel occupancy (PCO). Co-owned U.S. patent application Ser. No. 12/690,629, which is herein incorporated by reference in its entirety, discloses methods and systems for dynamically adjusting the page-concatenation level based on the radio frequency (RF) conditions being experienced by a mobile station. And co-owned U.S. patent application Ser. No. 12/558,359, which is herein incorporated by reference in its entirety, discloses methods and systems for dynamically adjusting the page-concatenation level based on a paging-attempt status of the page (e.g., whether it is the first, second, or third attempt to transmit a page). It is anticipated that exemplary methods and systems may be implemented in conjunction with or as part of any method or system capable of changing the amount of concatenation being applied, including but not limited to the methods and systems disclosed in the above co-owned applications.

Concatenating multiple pages in a common page message typically reduces the transmission size of the pages (i.e., the bandwidth required for transmission), and thus may help to reduce PCO. However, concatenating pages also has certain drawbacks. For example, since some information is inevitably lost through concatenation, the probability of a mobile station receiving a page may decrease due to concatenation of the page. Further, some mobile stations may not be configured to recognize a page in a concatenated format. Thus, while concatenation may reduce the PCO, there may be a tradeoff, as concatenation may reduce the paging success rate (PSR) as well. In practice, a two to three percent decrease in the paging success rate has been observed.

To compensate for the reduction in PSR that can result from concatenation, exemplary methods and systems are provided to dynamically adjust the power used for the transmission of pages based on the concatenation of the pages. For example, in CDMA systems, multiple pages (each referred to as a "page record") may be concatenated in a general page message (GPM), and the page-transmission power used for the GPM may be determined according to the amount of concatenation applied to the page records. In an exemplary embodiment, a base station generally increases the page-transmission power as the amount of concatenation increases. Since increasing the page-transmission power typically increases the probability that a mobile station will successfully receive a page, increasing the page-transmission power concurrently may improve the PSR (and thus help to at least partially offset the reduction in PSR that might otherwise result from increased concatenation).

In one aspect, an exemplary method for paging a mobile station involves an access network: (i) before transmission of a page to a mobile station by the access network, identifying any concatenation that is being applied to the page; (ii) based at least in part on the concatenation that is being applied to the page, selecting a page-transmission power for the page; and (iii) transmitting the page to the mobile station at the selected page-transmission power. Preferably, a base station implements this method to increase the page-transmission power as the amount of concatenation increases, which may help to improve the paging success rate (PSR) for concatenated pages, among other benefits.

Further, in an exemplary embodiment, the page may comprise a page record that is transmitted in a general page message (GPM). As such, the concatenation may be identified by determining the protocol being used to create the GPM or by determining how many page records can be concatenated in the GPM under the protocol being used for the GPM. Alternatively, the concatenation may be identified by determining how many page records are actually included in the GPM.

Yet further, in an exemplary embodiment, the selection of the page-transmission power may involve: (a) if no concatenation is being applied, then selecting a first page-transmission power for the page; (b) if two page records can be concatenated in the GPM, then selecting a second page-transmission power for the page; (c) if four page records can be concatenated in the GPM, then selecting a third page-transmission power for the page; and (d) if eight page records can be concatenated in the GPM, then selecting a fourth page-transmission power for the page. Preferably, the fourth page-transmission power is greater than the third page-transmission power, the third page-transmission power is greater than the second page-transmission power, and the second page-transmission power is greater than the first page-transmission power. For example, the first page-transmission power may be set at 1.2 watts, the second page-transmission power may be set at 1.35 watts, the third page-transmission power may be set at 1.5 watts, and the fourth page-transmission power may be set at 1.8 watts.

In a further aspect, an exemplary system is disclosed that includes: (i) tangible data storage; (ii) at least one processor; and (iii) program logic stored in the data storage that, when executed by the at least one processor, causes a radio access network to: (a) before transmission of a page to a mobile station, identify any concatenation that is being applied to the page; (b) based at least in part on the concatenation that is being applied to the page, select a page-transmission power for the page; and (c) transmit the page to the mobile station at the selected page-transmission power.

And in a further aspect, an exemplary tangible computer-readable medium is disclosed, which has instructions stored thereon. According to an exemplary embodiment, the instructions include: (i) instructions for, before transmission of a page to a mobile station by an access network, identifying any concatenation that is being applied to the page; (ii) instructions for, based at least in part on the concatenation that is being applied to the page, selecting a page-transmission power for the page; and (iii) instructions for causing the access network to transmit the page to the mobile station at the selected page-transmission power.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

Referring to the drawings, as noted above, FIG. 1 is a simplified block diagram of a wireless communication network in which exemplary embodiments can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or another machine-readable medium (i.e., data storage, rather than a mere signal), to achieve, for instance the useful, concrete, and tangible result of helping to improve the paging success rate in an access network.

Figure 1:
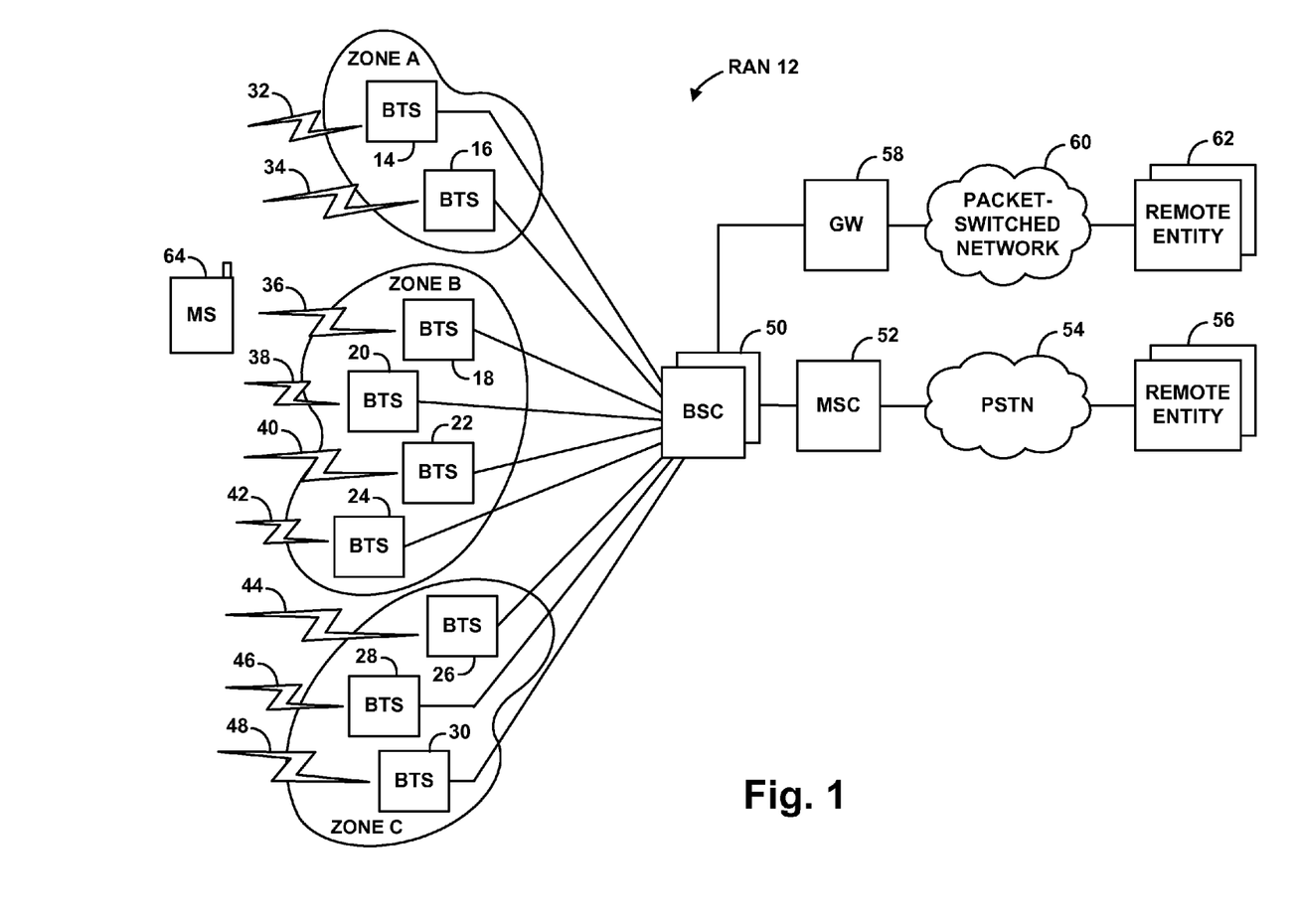
FIG. 1 is a simplified block diagram of a wireless communication network in which exemplary embodiments can be implemented.

As shown in FIG. 1, the exemplary network includes at its core a radio access network (RAN) 12 that radiates to define numerous coverage areas in which mobile stations can engage in RF communication with the RAN. The coverage areas shown in the figure can be cell sites, cell sectors, or some other defined wireless coverage area (possibly even a combination of coverage provided by multiple BTSs). The RAN 12 may define these coverage areas discretely through use of directional antennas and/or by various modulation parameters, including, without limitation, carrier frequencies and PN offsets or other parameters, depending on the air interface protocol used. Example air interface protocols include CDMA (e.g., IS-95, IS-2000, 1xRTT, 1xEV-DO, etc.), iDEN, WiMAX, TDMA, AMPS, GSM, GPRS, UMTS, EDGE, LTE, WI-FI (e.g., 802.11), BLUETOOTH, and others now known or later developed. In practice, the coverage areas may overlap to some extent, so that a served mobile station can move seamlessly from one coverage area to another.

In general, a RAN 12 may take various forms and may include any of a variety and number of components, depending for instance on the air interface protocol employed by the RAN. As such, the RAN 12 may vary in degree of complexity, from a simple wireless access point router to a more complex system such as that shown for instance. It should be understood that actions that are generally described as being carried out by the RAN, may be carried out by various different RAN entities or combinations of RAN entities. Furthermore, actions described as being carried out by one RAN entity, such as a BTS or MSC, may also be carried out in whole or in part by other RAN entities, without departing from the scope of the invention. Yet further, note that the combination of one or more BTSs and a BSC may be considered a base station. However, a BTS can, taken alone, be considered a base station as well. Additionally, a base station may also make use of or include functions that are typically provided by an MSC, a PDSN, and/or any other entity.

As shown, the RAN 12 may include numerous base transceiver stations (BTSs) 14-30 and one or more base station controllers (BSCs) 50 (which may be integrated with one or more of the base stations). For simplicity, just a single coverage area is shown emanating from each BTS, but it is further understood that a typical BTS may provide multiple discrete coverage areas, such as multiple cell sectors for instance. As such, the BTSs 14-30 may include directional antennas, power amplifiers, and associated transceiver equipment arranged to establish corresponding wireless coverage areas via air interfaces 32-48 as shown and to communicate with mobile stations in those coverage areas. In an exemplary embodiment, each BTS 14-30 preferably includes, possibly for each sector, a power amplifier such as a tower-top amplifier for instance, which is arranged to amplify RF signals for transmission over the respective air interface to mobile stations. Preferably, the power amplifier has a variable gain that can be set by a control signal received from a controller such as BSC 50 or from other base station equipment for instance. Variable gain power amplifiers are well known in the art and are therefore not described in detail here.

Each BSC 50 may be coupled with one or more switches, such as a mobile switching center (MSC) 52, which provide connectivity with the public-switched telephone network (PSTN) 54, so that served mobile stations can communicate with remote entities 56 on the PTSN. Additionally or alternatively, each base station controller may be coupled with one or more gateways, such as packet data serving node (PDSN) 58, which provides connectivity with a packet-switched network 60, so that served mobile stations can communicate with remote entities 62 on the packet-switched network.

FIG. 1 depicts a representative mobile station 64 by way of example, which could be a cell phone, wirelessly equipped personal digital assistant (PDA), or any other type of wirelessly-equipped device now known or later developed. The mobile station is preferably equipped with hardware, software, and/or other logic to communicate with RAN 12 in accordance with an agreed communication protocol, such as one of the protocols noted herein for instance. For example, in an exemplary embodiment, mobile station 64 includes a wireless communication interface that functions to facilitate air interface communication with RAN 12 according to one or more protocols such as those noted above. Further, mobile station may include a user interface, which typically includes components for receiving input from a user of mobile station and providing output to a user of the mobile station. More generally, mobile station 64 may include program logic stored in data storage (e.g., one or more volatile and/or non-volatile storage components of the mobile station, such as magnetic, optical, or organic storage components) and executable by one or more processors (e.g., general purpose and/or special purpose processors) to carry out various functions described herein.

Each mobile station, such as mobile station 64, typically has at least one associated identifier that uniquely identifies the mobile station. By way of example, a mobile station may have a unique mobile directory number (MDN), a unique International Mobile Subscriber Identity (IMSI), a unique MAC address, or some other identifier dynamically or statically assigned to the mobile station, which may serve as its address for receiving air interface communications transmitted to it by the RAN. As a specific example, an IMSI is a unique number associated with the mobile station, typically taking the form of the mobile station's phone number. Additionally or alternatively, each mobile station may be assigned a mobile identification number (MIN).

When RAN 12 seeks to page a mobile station 64 (e.g., for an incoming call or for some other reason), a switch, such as MSC 52, may send a page to one or more base stations in the switch's coverage area, such as BTSs 18-24, with the hope that when the base stations broadcast the page message, the mobile station will receive the page message in one of the associated sectors, and will respond. In practice, given the scarcity of paging channel resources, most modern cellular networks are instead arranged to engage in a more targeted paging process known as "zone-based paging." However, it should be understood that exemplary methods and systems may be implemented in conjunction with any paging scheme. For instance, an exemplary system may also employ a paging scheme where the switch receives a page (e.g., an incoming call) and simply forwards the page to the base station serving a coverage area in which the intended recipient of the page is located for transmission in the coverage area by the base station. Other configurations are also possible.

With zone-based paging, a cellular network is divided into paging zones (e.g., Zones A-C), each with a respective zone ID. When a switch seeks to page a mobile station, the switch may send the page message to just those base stations that are within the zone of the mobile station's last registration, as it is likely that the mobile station is in that zone. Further, the switch may send the page message to the base stations in zones adjacent to the mobile station's zone of last registration, to cover the possibility that the mobile station has moved to a new zone but has not yet registered its presence in the new zone.

Once the designated base stations transmit the page message, if the mobile station does not respond to the page, the switch may then broaden the scope of the page, by sending the page message to a wider range of paging zones and perhaps ultimately to all base stations in the switch's serving area. For example, in practice, CDMA networks may first attempt to transmit a page record in the paging zone in which the mobile station is registered (i.e., the base stations in the paging zone in which the mobile station is registered transmit the page record). Then, if the first attempt is unsuccessful (i.e., the mobile station does not acknowledge the page record), the network makes a second attempt to page the mobile station by again transmitting the page record in the paging zone in which the mobile station is registered, and possibly in adjacent zones as well. If the second attempt also fails, then the network makes a third attempt to page the mobile station, which typically involves a system-wide transmission of the page record (i.e., in all paging zones), although it is possible that a third attempt may be of a different scope as well.

According to an exemplary embodiment, a RAN 12, and in particular, a RAN entity or combination of RAN entities such as a one or more base stations (e.g., BTSs 14-30 and/or BSC 50), and/or one or more switches (e.g., MSC 52), may be configured to page one or more mobile stations by transmitting a General Page Message (GPM), which can include multiple pages.

Each page in a GPM may also be referred to as a "page record." In an exemplary embodiment, an MSC typically receives an indication that a mobile station should be paged (e.g., an incoming call), which includes an identifier of the mobile station, such as a MIN or IMSI. The MSC may then use the MIN or IMSI as a basis to determine the carrier air interface (CAI) transmit address fields, and encode these fields into a page record. The page record may then be sent to one or more base stations. Each base station may then include the page record in a GPM, which the base station transmits in its coverage area.

According to an exemplary embodiment, a base station may be configured to create a GPM that includes multiple page records, such that multiple mobile stations can be paged using a single page message. Furthermore, page records may be concatenated so that more page records may be included in a GPM than otherwise could be. For example concatenation may be implemented such that up to eight page records may be concatenated in a single GPM. Alternatively, concatenation may be implemented such that up to two page records may be concatenated in a single GPM. Other concatenation techniques are also possible.

When page records are not concatenated, each GPM typically includes only one page record. Since each GPM typically occupies two 20 ms half-frames, no more than four unconcatenated page records can be transmitted in a single 80 ms paging-channel slot. In comparison, when two page records are concatenated in a GPM, the GPM that can typically be sent in two to three half frames. Such concatenation schemes may thus allow for at least five page records to be sent in a single 80 ms paging-channel slot. When two to eight page records are concatenated in a GPM, a GPM may be sent in two to eight half frames, which allows a base station to transmit up to eight page records in a single 80 ms paging-channel slot.

When multiple page records are concatenated in a GPM, some information which is typically included in a page is not repeated for each page record. For example, length bits, overhead bits, CRC bits, and reserved bits, are not repeated for each page record in a GPM. However, there may be a performance tradeoff for increasing concatenation (which may reduce the paging channel occupancy (PCO)). Since more page records are being concatenated into the same 80 some page records may fail to reach their intended mobile stations, which reduces the paging-success rate (PSR).

Figure 2:
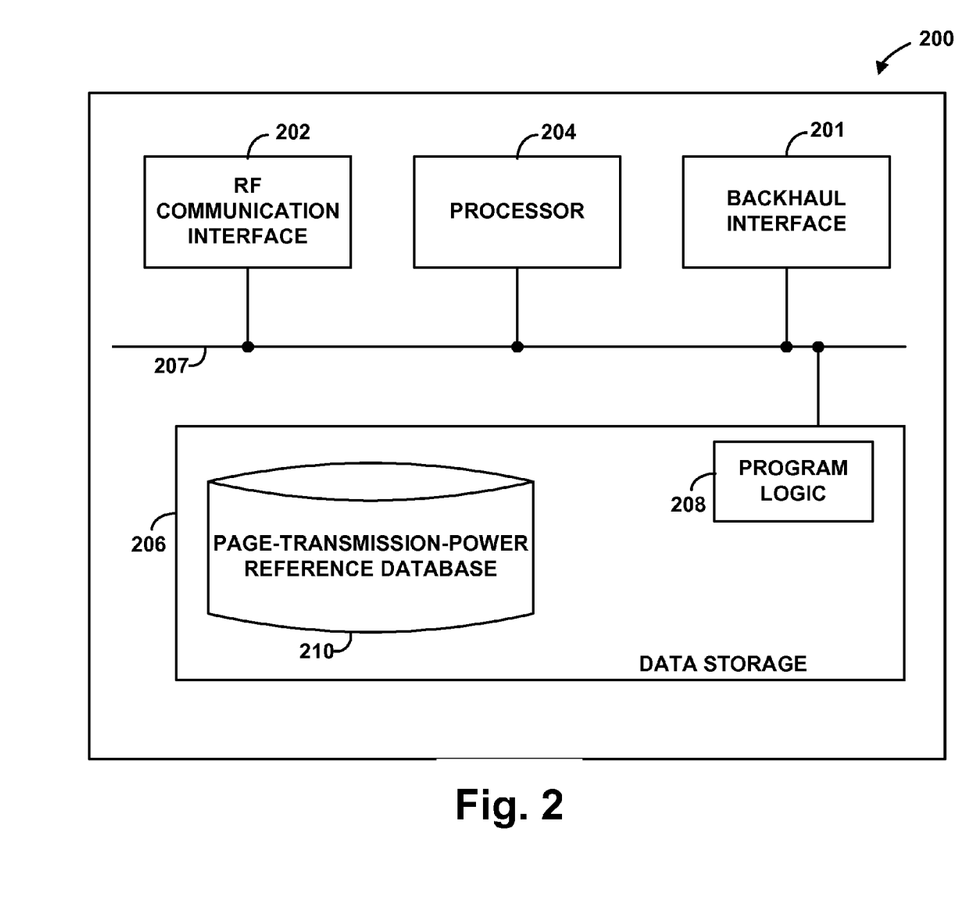
FIG. 2 is a simplified block diagram showing functional components of an exemplary base station, according to an exemplary embodiment.

FIG. 2 is a simplified block diagram showing functional components of an exemplary base station 200 (or any other entity or entities arranged to carry out analogous functions). As shown, the base station 200 includes a backhaul interface 201, an RF communication interface 202, a processor 204, and data storage 206, all of which may be communicatively linked together by a system bus, network, or one or more other connection mechanisms 207. Backhaul interface 201 may comprise any sort of communication link or mechanism enabling the base station to exchange signaling and bearer data with other RAN entities, such as an MSC or possibly a BSC (in the event that base station 200 takes the form of a BTS). RF communication interface 202 may comprise any sort of interface enabling base station 200 to engage in air-interface communications with a mobile station.

Processor 204 may comprise one or more processors (e.g., general purpose and/or special purpose processors), such as microprocessors for instance. Further, data storage 206 may comprise one or more volatile and/or non-volatile storage components, such as magnetic, optical, or organic storage components, integrated in whole or in part with processor 204. As further shown, data storage 206 preferably contains program logic 208 (e.g., machine language instructions) executable by processor 204 to carry out various base-station functions described herein.

According to an exemplary embodiment, a network entity or entities, such as base station 200, may be configured to dynamically adjust the amount of power used to transmit a GPM, based on the concatenation being applied to the page records included in the GPM. Preferably, the base station 200 is configured to increase the page-transmission power used to transmit a GPM as more concatenation is applied to the page records, and vice versa. By doing so, the base station may help to increase the paging success rate (PSR) for pages that are concatenated. However, it should be understood that the base station may, based upon the amount of concatenation being applied, adjust the page-transmission power in any manner, without departing from the scope of the invention.

To facilitate the dynamic adjustment of page-transmission power, an exemplary base station may include or have access to a page-transmission-power reference database 210, which maps concatenation levels and/or indications of the amount of concatenation being applied (such as the protocol being used to create a GPM) to corresponding page-transmissions powers. For example, the reference database 210 may include data indicating a page-transmission power that corresponds to each protocol that base station 200 may use to concatenate page records (e.g., FR4916E, FR4916B, and/or FR4916), as well as a page-transmission power to be used when no concatenation is applied. Additionally or alternatively, the reference database 210 may indicate the page-transmission power according to a corresponding number of page records included in a given GPM. Other formats for the page-transmission-power reference database are also possible.

As yet another alternative, the reference database 210 may indicate a base page-transmission power to be used when a base number of pages are included in a GPM, and indicate an incremental power increase to be applied, depending on the number of pages in excess of the base number. For example, the reference database 210 may indicate that a base power of 1.2 watts should be used when up to four page records (the base number) are included in a GPM, and that the page-transmission power should be increased in increments of 0.15 watts, for each page record in excess of four, which is concatenated in a GPM. Other examples are also possible.

It should be understood that while page-transmission-power reference database 210 is shown as being stored at base station 200 in data storage 206, the reference database 210 may also be stored at the base station in separate data storage. Further, reference database 210 could also be stored at a remote entity, which is accessible to base station 200, without departing from the scope of the invention.

Preferably, the switch (e.g., the MSC) through which base station 200 is connected provides the base station 300 with reference database 210, or with data to populate reference database 210. For example, when base station 200 is installed and connected to a switch, the switch may send base station 200 the data to populate the reference database 210, which may have been defined by the service provider. It should be understood, however, that reference database 210 may be populated, and possibly updated, in any manner, without departing from the scope of the invention.

Figure 3:
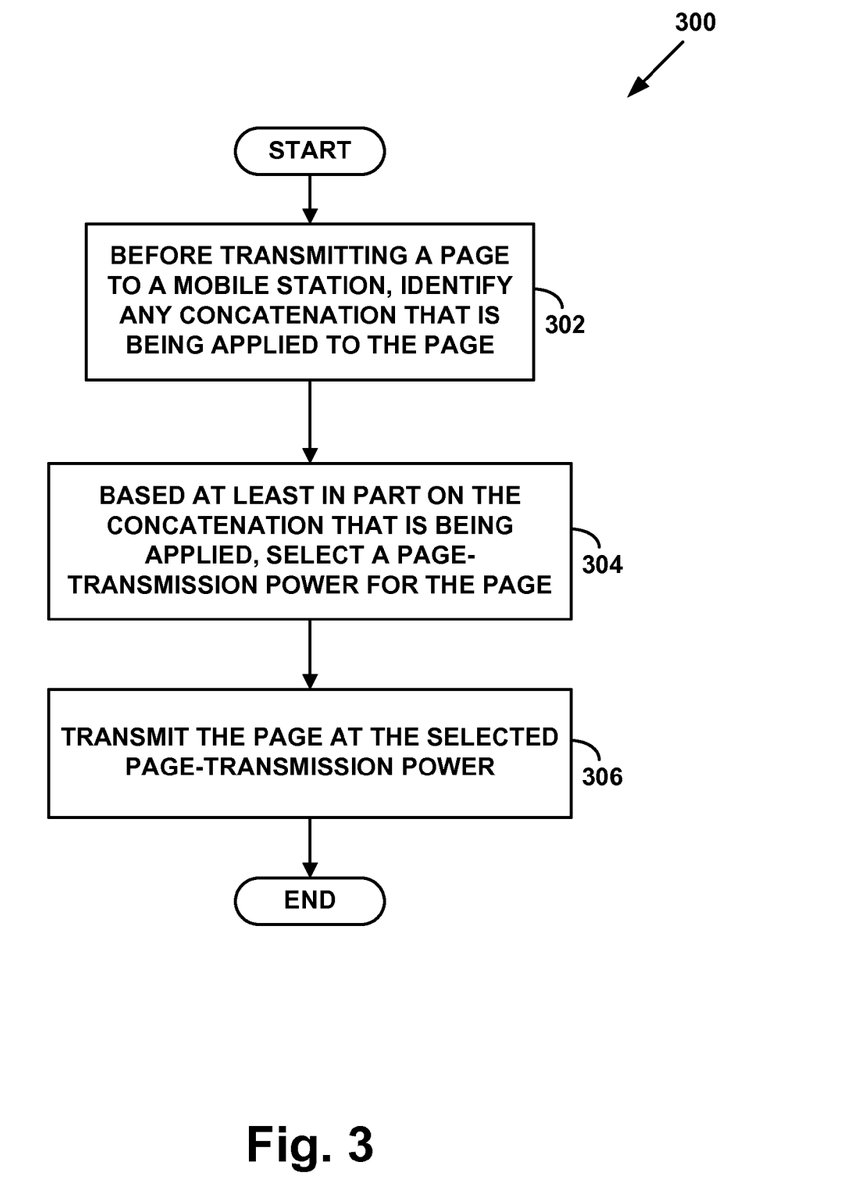
FIG. 3 is a flow chart illustrating a method, according to an exemplary embodiment.

FIG. 3 is a flow chart illustrating a method 300, according to an exemplary embodiment. The method 300 may be implemented by an access network in order to dynamically adjust page-transmission power based on paging concatenation. Method 300 involves the access network, before transmitting a page to a mobile station, identifying any concatenation that is being applied to the page, as shown by block 302. Then, based at least in part on the concatenation that is being applied, the access network selects a page-transmission power for the page, as shown by block 304. The access network then transmits the page to the mobile station at the selected page-transmission power, as shown by block 306.

It should be understood that functions described as being carried out be an access network generally, such as method 300, may be carried out in whole or in part by any appropriate RAN entity or combination of RAN entities. By way of example, exemplary methods may also be described herein as being carried out by a base station (e.g., a BTS and/or BSC). However, it should be understood that such an exemplary method, or portions thereof, may also be carried out by other entities, such as an MSC, without departing from the scope of the invention.

The function of identifying any concatenation that is being applied to the page, as shown by block 302, may be implemented using various techniques. For example, a base station may determine the protocol being used to create the GPM in which a given page record is being transmitted. More specifically, since protocols such as FR4916E, FR4916B, and FR4916 define specific concatenation techniques, the concatenation being applied to a given page may be identified from the protocol being used by the base station (i.e., the protocol being used to create the GPM that includes the page).

In embodiments where the base station determines the protocol being used to create a GPM, the function of selecting a page-transmission power for the page, shown by block 304, may be based upon the protocol. As a basic example, if no concatenation is being applied to a page (e.g., if the protocol for transmitting a page does not call for concatenation of pages), then the base station may select a first page-transmission power for the page. And if there is some amount of concatenation applied to a page, the base station may select a second page-transmission power, which is preferably greater than the first page-transmission power. For instance, the base station may increase the page-transmission power whenever a GPM is created according to FR4916E (or another protocol involving the concatenation of pages), as compared to when no concatenation is applied to a page. Other examples are also possible.

In practice, the base station may determine the maximum number of page records that may be concatenated in a GPM under a given protocol, rather than identify the protocol itself. For instance, the base station may determine that up to eight page records may be concatenated in a GPM (such as when FR4916E is in use), or that up to two page records may be concatenated in a GPM (such as when FR4916B or FR4916 is in use), or that only a single page record may be included in a GPM (such as when no concatenation is being applied to page records). The base station may then select a page-transmission power based on this maximum number of pages that may be concatenated in the GPM.

Alternatively, the function of identifying any concatenation that is being applied to the page, shown by block 302, may involve the base station determining how many pages are actually being concatenated in a given GPM, and setting the page-transmission power based on this number. This number may or may not be equal to the number of pages that can be concatenated under the protocol being used. For example, when a base station uses FR4916E, which allows for eight page records in a single GPM, there may only be five page records that need to be sent in a given a given GPM. In such embodiments, the function of selecting a page-transmission power for the page, shown by block 304, may be based upon the number of pages actually being concatenated in a given GPM. Accordingly, in the above example, the page-transmission power may be selected based upon the fact that the GPM includes five page records, even though under FR4916E, up to eight pages may be included in a GPM. Other examples are also possible.

It should be understood that, in practice, the selection of a page-transmission power for a given page may be implemented by selecting a page-transmission power for the GPM in which the page is included. Further, since multiple page records may be included in a single GPM, the selection of a page-transmission power for a given GPM, may effectively be the selection of a page-transmission power for all the pages (i.e., page records) included in the GPM. Accordingly, in some embodiments, the function of selecting a page-transmission power for a page may be understood to include the selection of a page-transmission power for the GPM in which the page is included, as well as the selection of a page-transmission power for any other pages included in the GPM.

Figure 4:
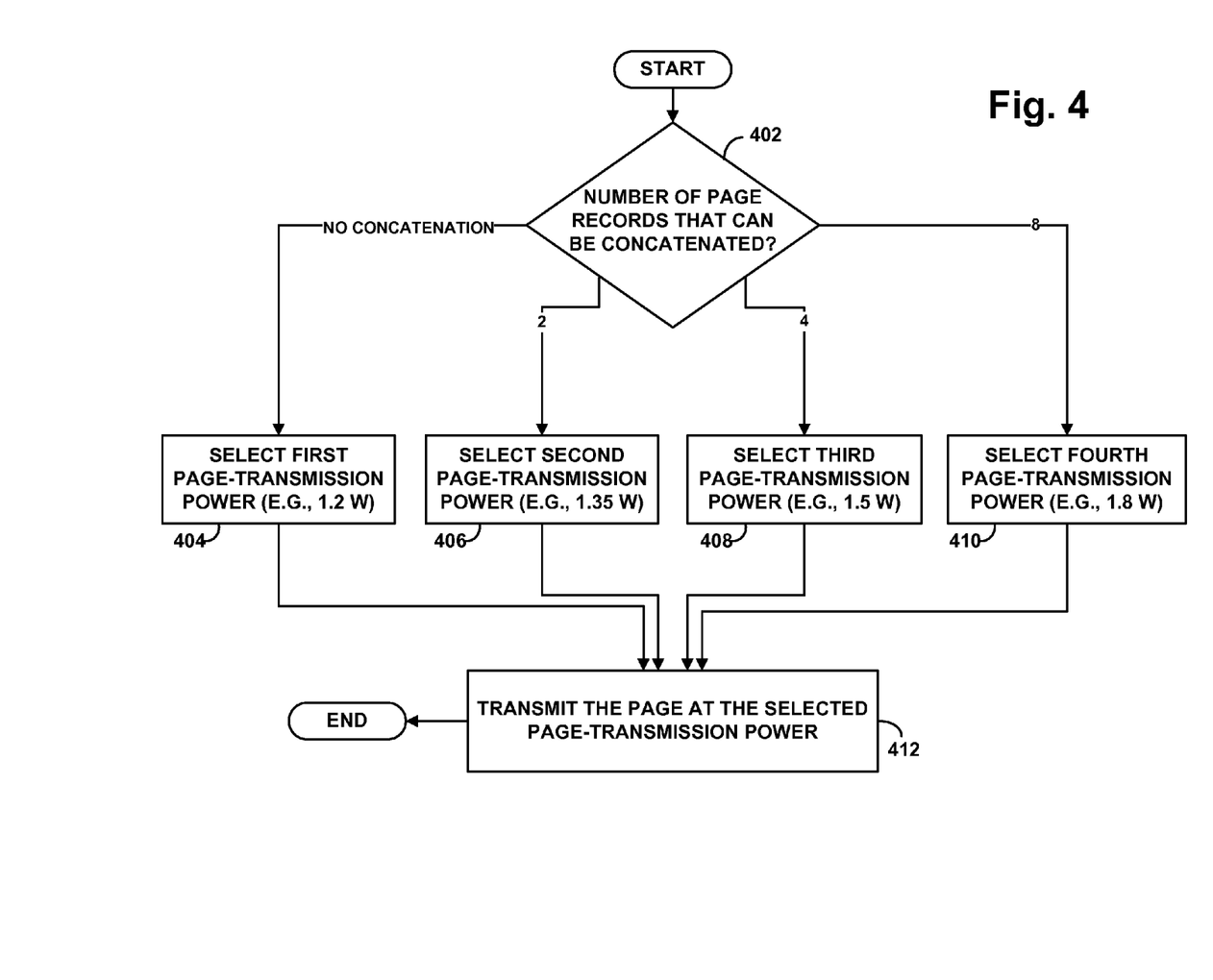
FIG. 4 is another flow chart illustrating a method, according to an exemplary embodiment.

FIG. 4 is a flow chart illustrating a method 400, in which selection of the page-transmission power for a GPM (and the pages included therein) is based on the number of pages that can be concatenated in the GPM, according to the protocol being employed. As shown, method 400 involves the base station determining the number of page records (if any) that can be concatenated in the GPM, as shown by block 402. For instance, the base station might determine that no concatenation is being applied, that two pages can be concatenated in the GPM (e.g., as specified by FR4916B or FR4916), or that eight pages can be concatenated in the GPM (e.g., as specified by FR4916E). Further, it is contemplated that the present invention may be implemented in conjunction with other protocols now known or later developed, under which the numbers of page records that can be concatenated in a GPM may vary. For example, method 400 provides page-transmission powers for protocols using no concatenation, as well as protocols in which two, four, and eight page records can be concatenated in a GPM. Many other examples are also possible.

Referring to method 400 more specifically, if no concatenation is being applied, then the base station selects a first page-transmission power for the page, as shown by block 404. If two page records can be concatenated in the GPM, such as if FR4916B or FR4916 is being used, then the base station selects a second page-transmission power for the page, as shown by block 406. If four page records can be concatenated in the GPM, then the base station selects a third page-transmission power for the page, as shown by block 408. And, if eight page records can be concatenated in the GPM, such as if FR4916E is being used, then the base station selects a fourth page-transmission power for the page, as shown by block 410. The base station then transmits the GPM (and thus the pages included therein) at the selected page-transmission power, as shown by block 412.

Preferably, as the number of pages that can be concatenated GPM increases (which typically corresponds to an increased amount of concatenation being applied to each page record), the base station increases the page-transmission power. For example, as shown in FIG. 4, the first page-transmission power (selected when no concatenation is applied to page records) may be 1.2 watts, the second page-transmission power (selected when two page records can be concatenated in a GPM) is 1.35 watts, the third page-transmission power (selected when four page records can be concatenated in a GPM) is 1.5 watts, and the fourth page-transmission power (selected when eight page records can be concatenated in a GPM) is 1.8 watts. Other examples are also possible. More generally, the page-transmission power corresponding to a given amount of concatenation (or to various levels of concatenation) may vary, and may be selected as a matter of engineering design choice.

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A method for paging a mobile station, the method comprising:
    before transmission of a page to a mobile station by an access network, the access network identifying concatenation that is being applied to the page, wherein the page comprises a page record that is transmitted in a general page message (GPM) by a base station in the radio access network, and wherein identifying the concatenation that is being applied to the page comprises determining how many page records can be included in the GPM;
    based at least in part on the concatenation that is being applied to the page, the access network selecting a page-transmission power for the page; and
    the access network transmitting the page to the mobile station at the selected page-transmission power.

2. The method of claim 1, wherein selecting the page-transmission power for the page comprises:
    if no concatenation is being applied to the page, then selecting a first page-transmission power for the page; and
    if concatenation is being applied to the page, then selecting a second page-transmission power for the page.

3. The method of claim 2, wherein the second page-transmission power is greater than the first page-transmission power.

4. The method of claim 1, wherein identifying the concatenation that is being applied to the page further comprises determining the protocol being used to create the GPM.

5. The method of claim 1, wherein identifying the concatenation that is being applied to the page comprises determining how many page records can be concatenated in the GPM.

6. The method of claim 5, wherein selecting the page-transmission power for the page comprises:
    if no concatenation is being applied, then selecting a first page-transmission power for the page;
    if two page records can be concatenated in the GPM, then selecting a second page-transmission power for the page;
    if four page records can be concatenated in the GPM, then selecting a third page-transmission power for the page; and
    if eight page records can be concatenated in the GPM, then selecting a fourth page-transmission power for the page.

7. The method of claim 6, wherein the fourth page-transmission power is greater than the third page-transmission power, wherein the third page-transmission power is greater than the second page-transmission power, and wherein the second page-transmission power is greater than the first page-transmission power.

8. The method of claim 6, wherein the first page-transmission power is 1.2 watts, wherein the second page-transmission power is 1.35 watts, wherein the third page-transmission power is 1.5 watts, and wherein the fourth page-transmission power is 1.8 watts.

9. A system comprising:
    tangible data storage;
    at least one processor;
    program logic stored in the data storage that, when executed by the at least one processor, causes a radio access network to:
        (a) before transmission of a page to a mobile station, identify any concatenation that is being applied to the page, wherein the page comprises a page record that is transmitted in a general page message (GPM) by a base station in the radio access network, and wherein the identification of the concatenation that is being applied to the page comprises determining how many page records can be included in the GPM;
        (b) based at least in part on the concatenation that is being applied to the page, select a page-transmission power for the page; and
        (c) transmit the page to the mobile station at the selected page-transmission power.

10. The system of claim 9, wherein the program logic stored in the data storage that, when executed by the at least one processor, causes the radio access network to select the page-transmission power for the page, comprises program logic stored in the data storage that, when executed by the at least one processor, causes the radio access network to:
    if no concatenation is being applied to the page, then select a first page-transmission power for the page; and
    if concatenation is being applied to the page, then select a second page-transmission power for the page.

11. The system of claim 10, wherein the second page-transmission power is greater than the first page-transmission power.

12. The system of claim 9, wherein the page comprises a page record that is transmitted in a general page message (GPM) by a base station in the radio access network.

13. The system of claim 12, wherein the program logic stored in the data storage that, when executed by the at least one processor, causes the radio access network to identify the concatenation that is being applied to the page comprises program logic stored in the data storage that, when executed by the at least one processor, causes the radio access network to determine the protocol being used to create the GPM.

14. The system of claim 9, wherein the program logic stored in the data storage that, when executed by the at least one processor, causes the radio access network to select the page-transmission power for the page comprises program logic stored in the data storage that, when executed by the at least one processor, causes the radio access network to:
    if no concatenation is being applied, then select a first page-transmission power for the page;
    if two page records can be concatenated in the GPM, then select a second page-transmission power for the page;
    if four page records can be concatenated in the GPM, then select a third page-transmission power for the page; and
    if eight page records can be concatenated in the GPM, then select a fourth page-transmission power for the page.

15. The system of claim 14, wherein the first page-transmission power is 1.2 watts, wherein the second page-transmission power is 1.35 watts, wherein the third page-transmission power is 1.5 watts, and wherein the fourth page-transmission power is 1.8 watts.

16. A tangible computer-readable medium having instructions stored thereon, the instructions comprising:
- instructions for, before transmission of a page to a mobile station by an access network, identifying any concatenation that is being applied to the page, wherein the page comprises a page record that is transmitted in a general page message (GPM) by a base station in the radio access network, and wherein identifying the concatenation that is being applied to the page comprises determining how many page records can be included in the GPM;
- instructions for, based at least in part on the concatenation that is being applied to the page, selecting a page-transmission power for the page; and
- instructions for causing the access network to transmit the page to the mobile station at the selected page-transmission power.

17. The tangible computer-readable medium of claim 16, wherein the instructions for, based at least in part on the concatenation that is being applied to the page, selecting a page-transmission power for the page comprise:
- instructions for increasing the page-transmission power as the concatenation being applied increases.

* * * * *